United States Patent [19]

Myers

[11] Patent Number: 4,649,802
[45] Date of Patent: Mar. 17, 1987

[54] CONTROL VALVE

[75] Inventor: Lawrence R. Myers, South Bend, Ind.

[73] Assignee: Allied Corporation, Morristown, N.J.

[21] Appl. No.: 665,470

[22] Filed: Oct. 29, 1984

[51] Int. Cl.⁴ ............................................. F15B 9/10
[52] U.S. Cl. ................................. 91/376 R; 60/547.1; 91/519; 92/50
[58] Field of Search ............ 91/170 R, 519, 369 A, 91/376 R; 60/547.1; 92/50, 69 R, 75

[56] References Cited

U.S. PATENT DOCUMENTS

| 3,373,662 | 3/1968 | Voll | 92/50 |
| 3,388,635 | 6/1968 | Hager | 91/170 R |
| 3,420,145 | 1/1969 | Stumpe | 91/376 R |
| 4,387,626 | 6/1983 | Myers | 92/50 |
| 4,516,474 | 5/1985 | Ochiai | 60/547.1 |
| 4,571,943 | 2/1986 | Gaiser | 60/560 |

Primary Examiner—Abraham Hershkovitz
Attorney, Agent, or Firm—Leo H. McCormick, Jr.; Ken C. Decker

[57] ABSTRACT

A control valve (81) for a vacuum brake booster (10) having a sleeve member (96) for positioning a poppet valve (92) in a bore (74) of a hub (28) and defining the limits for a continuous flow path (98) between a first chamber (30) and a second chamber (68) within the hub (28).

4 Claims, 2 Drawing Figures

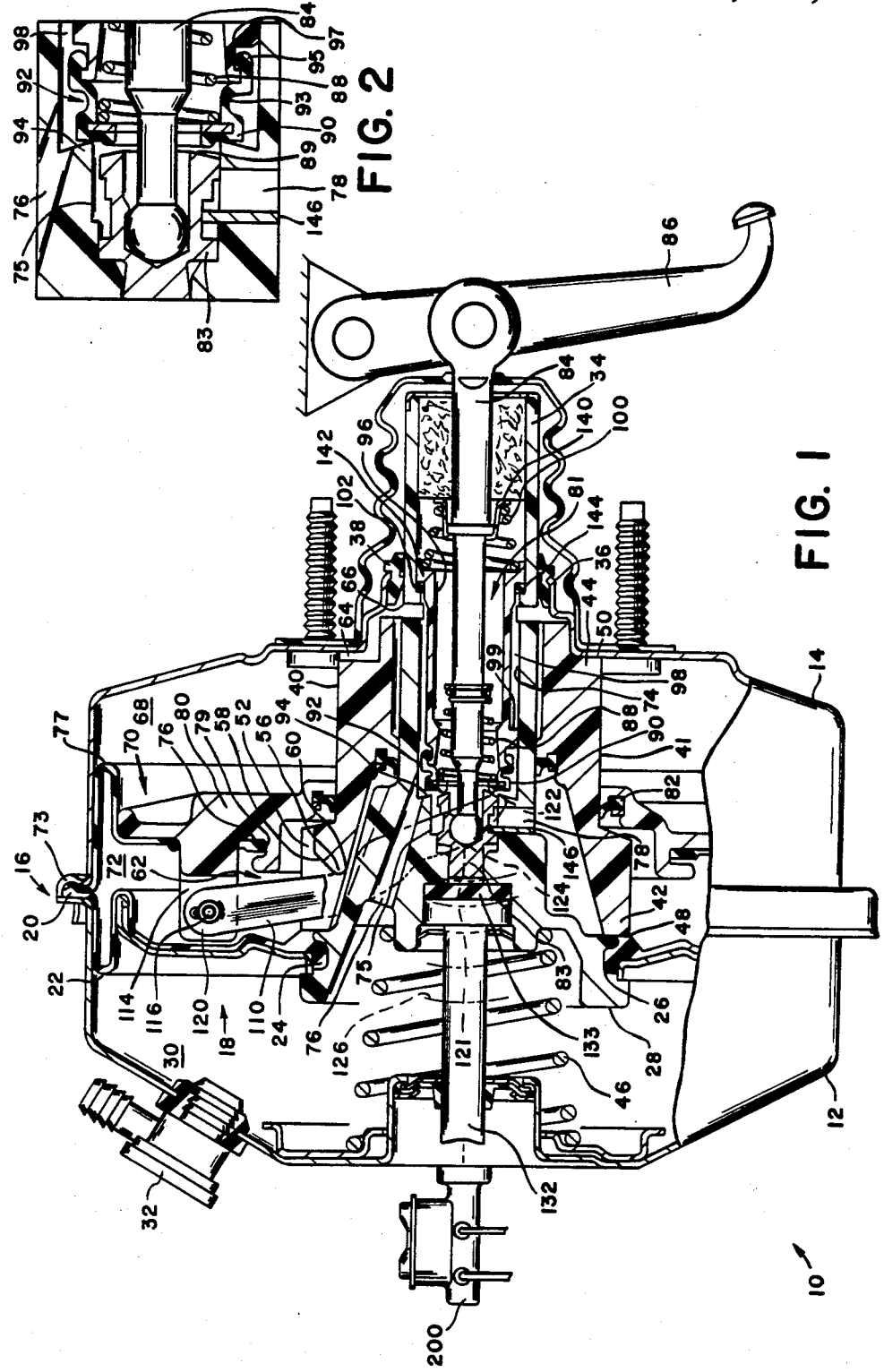

CONTROL VALVE

This invention relates to a control valve for a vacuum brake booster having a control chamber located between first and second chambers. A sleeve member located in a hub member positions a poppet member adjacent a vacuum seat and defines the limits of a continuous flow path between the first and second chambers to assure the development of the same operational pressure differential within the booster in response to an input signal.

In evaluation of the tandem brake booster disclosed in U.S. Pat. No. 4,387,626 and in an effort to simplify construction thereof, it was observed that the external communication conduit between the front and rear chambers may pose installation problems in some vehicles.

The tandem brake booster of the invention disclosed herein has a sleeve member which is located in the bore of the hub to define a continuous internal flow path between the front and rear chambers. In addition, the sleeve positions a poppet member adjacent a vacuum seat and an atmospheric seat. The poppet member responds to an input from an operator by moving to provide for communication of fluid to a control chamber to create a pressure differential across first and second movable walls that separate the front and rear chambers from the control chambers. A lever member transfers the output force developed by the second wall into the hub where it is combined with the output of the first wall to produce the output force of the brake booster.

An advantage of this invention occurs through the internal passages of the hub which cooperate with a sleeve member to create a continuous flow path between the front and rear chamber to assure that the same pressure differential acts on the first and second walls.

It is an object of this invention to provide a vacuum brake booster having front and rear chambers separated by a control chamber with an internal flow path to assure that the same fluid pressure is communicated to both the front and rear chambers at all times.

These advantage should be apparent from reading the specification while viewing the drawing.

The invention will now be described with reference to the accompanying drawings wherein:

FIG. 1 is a sectional view of a tandem brake booster having front and rear chambers separated from each other by a control chamber with a control valve made according to this invention: and FIG. 2 is a sectional view of the control valve of FIG. 1 in an operational position.

The tandem brake booster 10 shown in FIG. 1 has a housing formed by joining as first shell 12 to a second shell 14 by a twist lock mechanism 16. A first wall 18 has a diaphragm 22 with a first bead 20 retained by the twist lock mechanism 16 and a second bead 24 located in a groove 26 in a hub member 28. The first shell 12 and first wall 18 define a first chamber 30. The first chamber 30 is connected to a source of vacuum through check valve 32.

Hub member 28 has a projection 34 that extends from wall 18 through an opening 36 in shell 14. A bearing-seal arrangement 38 located in opening 36 engages projection 34 to hold the hub member 28 in axial alignment within housing 10.

A cylindrical member 40 which surrounds projection 34 has a first end 42 and a second end 44. In the rest position as shown in FIG. 1, return spring 46 located in chamber 30 acts on hub member 28 to position face 48 thereon against the first end 42 to hold end 44 against surface 50 on shell 14. As seen in FIG. 1, cylindrical member 40 as a first slot 52 and a second slot (not shown) located adjacent the first end 42. Each slot 52 has an apex 56 (only one shown) located at the bottom thereof that forms the fulcrum for a lever arrangement 62 only one of which is shown. Curved surfaces 58 and 60 which extend from apex 56 define the point of contact with the lever arrangement 62 after movement from the apex 56. The cylindrical member 40 has a series of slots 64 (only one is shown) that connect opening 66 in projection 34 with chamber 68.

A second wall 70 has a first bead 73 of diaphragm 75 retained by the twist lock arrangement 16 and a second bead 76 located in a groove 78 in a disc member 80. The disc member 80 has a seal 82 retained on the inner surface 81 thereof. Seal 82 surrounds surface 84 on cylindrical body 40. Diaphragm 74, disc 80, cylindrical member 40 and shell 14 effectively define the limits of chamber 68. Walls 18 and 70 and cylindrical member 40 define a chamber 72 between chambers 30 and 68. Chamber 30 is connected to a bore 74 by a passage 76, chamber 72 is connected to bore 74 by a passage 78 and chamber 68 is connected to bore 74 by way of passage or opening 66 in projection 34 and slot 64 in cylindrical member 40.

As seen in FIG. 2, a control valve 81 located in bore 74 has a plunger 83 connected to a push rod 84. Movement of plunger 84 by an input force applied to pedal 86 allows spring 88 to position face 90 of poppet member 92 against a vacuum seat 94. Sleeve 96 has a series of projection 99 that engage bore 34 to define a passage 98 which provides for continual communication between passage 76 and opening 66. A spring 100 attached to push rod 84 holds sleeve 96 against a stop or shoulder 102 to assure that poppet member 92 is positioned adjacent vacuum seat 94 and that passage 98 is aligned with opening 66 and passage 76.

The lever arrangement 62 located in chamber 72 has a first arm 110 and a second arm (not shown). Each of the arms 110 have a first end 120 fixed to wall 70 by a pivot pin 116 located in a yoke 114 and a second end 122. The second end 122 has a cam surface 124 that located on a curved surface 126 in a slot on hub 28. The cam surface 124 has a contact point 121 on curved surface 126 in slot 128 that is on the vertical axis of the output push rod 132 which provides master cylinder 200 with an operational input force.

The tandem brake booster 10 operates in the following manner.

When an internal combustion engine is operating, vacuum is produced at the intake manifold. This vacuum is communicated through check valve 32 to evacuate air from chamber 30. With vacuum in chamber 30, air in chamber 68 is evacuated by way of slots 64, opening 66, passages 98 and 76 while air in chamber 72 is evacuated by way of opening 78, bore 75, between seat 94 and face 90 and into passage 76. With vacuum in chambers 30, 68 and 72, return spring 46 acts on and holds hub 28 against the second end 42 of the cylindrical member 40. Contact point 121 engages cam surface 124 to position the second wall 70 in the manner shown in FIG. 1.

Spring 100 which is caged between retainer 140 and flange 142 on sleeve 96 holds O ring 144 against shoulder 102 to assure passage 98 is separated from bore 34. Key 146 engages plunger 83 to hold the control valve 81 in bore 34.

In response to an input force applied to pedal 86, push rod 84 moves in a vertical direction to move plunger 83 toward reaction disc 133. Initial movement of plunger 83 allows spring 88 to move face 90 against vacuum seat 94 as shown in FIG. 2. The flexible portion 93 of the poppet 92 allows spring 88 to easily move end or face 90 against seat 94 while bead 95 is retained in groove 97 on the end of sleeve member 96 to effectively seal passage 98 from bore 74.

Further movement of plunger 83, moves atmospheric seat 89 away from face 90 air to enter chamber 72 by flowing from bore 74, between seat 89 and face 90, through bore 75 and out passage or opening 78. With air in chamber 72 and vacuum in chambers 30 and 68, a pressure differential is created across walls 18 and 70. This pressure differential acts on wall 18 to produce an output force that is directly transferred to push rod 132 by way of reaction disc 133. Since this pressure differential moves wall 70 in an opposite direction than wall 18, lever member 62 is needed to transfer movement of wall 70 into hub 28. As wall 70 moves toward shell 14 by sliding on surface 41, lever arms 110 (and a force balanced opposite placed arm not shown) pivot on fulcrum apex 52 to transfer the output of the second wall 70 into hub 28 through cam surface 124 on end 122. The cam surface engagement point 121 is designed such that the input from wall 70 is introduced to hub 28 along a vertical plane without the introduction of any rotative torque on the hub 28.

On termination of the input force to pedal 86, spring 100 moves face 89 on plunger 83 into engagement with face 90 to interrupt the communication of air from bore 74 to bore 75. Further movement of plunger 83 allows spring 100 to compress the flexible portion 93 of poppet 92 by overcoming spring 88 to allow face 90 to move away from vacuum seat 94 and permit vacuum present in chamber 30 to evacuate air from chamber 72. As air is evacuated from chamber 72, the pressure differential across walls 18 and 70 is reduced which allows return spring 46 to move the walls 18 and 70 to the rest position shown in FIG. 1.

I claim:

1. A vaccum brake booster having a center control chamber located between first and second operational chambers, said booster being responsive to communication of operations fluid to said control chamber from a control valve to create a pressure differential across a first wall located between said first chamber and control chamber and a second wall located between said second chamber and control chamber, said first and second walls moving in opposite directions in response to said pressure differential to produce first and second operational forces, said first and second operational forces being combined to develop an output force corresponding to an input force, the improvement in the control valve comprising:

a hub member attached to said first wall and having a projection that extends through said control chamber and second chamber, said hub having a bore therein with a first passage connected to said first chamber, a second passage connected to said second chamber and a third passage connected to said control chamber, said hub having a vacuum seat located between said first and third passages and a shoulder located adjacent said second passage;

a sleeve member having a flange on one end that engages said shoulder and a groove on the other end, said sleeve having a smaller diameter than said bore and extending to a position adjacent said vacuum seat to define a continuous flow path between said first and second passages, said sleeve having a series of hold off members than engage said projection to assure that the continuous flow path is maintained between said sleeve and projection and thereby assure that the first and second chambers are in constant communication;

a poppet member having a first bead separated from a second bead by a flexible section, said first bead being located in said groove of the sleeve member, said second bead being free to move within said bore;

a plunger located in said bore and connected to a push rod for receiving said input force, said plunger having an atmospheric seat located thereon;

first resilient means connected to said push rod for urging said second bead toward said vacuum seat; and second resilient means for urging said plunger toward a stop where said atmospheric seat engages said first bead in the absence of an input force to allow free communication between the first, second and control chambers, said plunger responding to an input force by moving and allowing said first resilient means to move said first bead into engagement with said vacuum seat and interrupt communication between said first passage and said third passage and initiate communication of said fluid through said bore to said control chamber for the development of said pressure differential.

2. The control valve as recited in claim 1 further including:

a seal located between said shoulder and flange to prevent communication between an interior of the sleeve member and said second passage.

3. The control valve as recited in claim 2 wherein said second resilient means is caged between said flange and a retainer on said push rod, said second resilient means holding said flange against said seal to assure the continuous flow path remains separated from the interior of said sleeve member.

4. The control valve as recited in claim 3 wherein said sleeve member has a length that approximates the stroke of said second wall.

* * * * *